Oct. 25, 1960  W. W. MARSHALL III  2,957,203
PROCESS AND APPARATUS FOR MAKING PLASTICS
Filed April 26, 1957
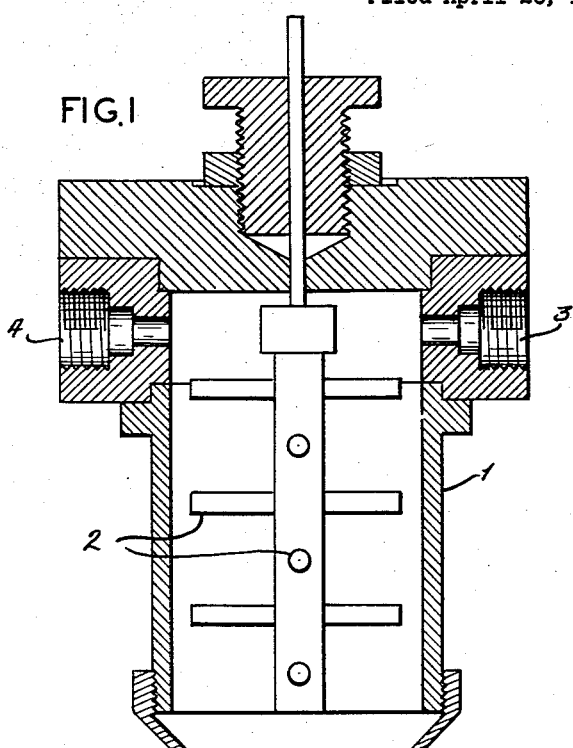
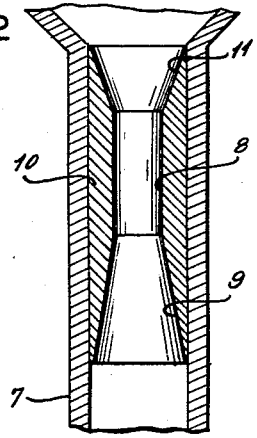
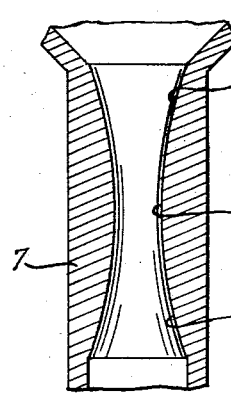
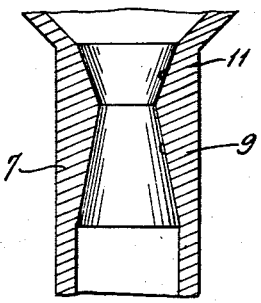
INVENTOR
WILLIAM W. MARSHALL
By
ATTORNEY

United States Patent Office 2,957,203
Patented Oct. 25, 1960

2,957,203

PROCESS AND APPARATUS FOR MAKING PLASTICS

William W. Marshall III, St. Louis, Mo., assignor to Mobay Chemical Company, St. Louis, Mo., a corporation of Delaware Filed Apr. 26, 1957, Ser. No. 655,274

4 Claims. (Cl. 18—30)

This invention relates generally to a method and apparatus for making porous plastics from liquid components which, when mixed together, form a solid product and, more particularly, to a process and apparatus for making cellular polyurethane plastics.

It has been disclosed that porous or cellular plastics may be formed by mixing together a polyisocyanate and an organic compound having a reactive hydrogen atom. These compounds react chemically with each other to form a polyurethane compound. It is preferred to use a polyhydroxyl compound and water is usually added in order to produce carbon dioxide which forms the pores in the resulting polyurethane product. Activators or catalysts may be included in the formulation in order to control the reaction rate and the characteristics of the finished product.

It is necessary that the various components going into the polyurethane plastic be rapidly mixed together and poured into a suitable molding device before completion of the chemical reaction. An apparatus that is admirably suited for this purpose is disclosed in U.S. Patent 2,764,-565, granted to P. Hope et al., September 25, 1956. This apparatus provides a means for intimately mixing the catalyst and other components of the polyurethane plastic together and permits accurate variation of the proportion of components in the mixture as required to obtain the desired degree of rigidity or flexibility in the finished foam. It has been found, however, that relatively large slabs of the polyurethane plastic foam made with this apparatus may have a tendency to crack and the product may not always have a cellular structure that is relatively uniform in cell size. Moreover, the product frequently has large voids therein resulting from splashing of the reaction mixture as it is poured. It has been proposed to include a paraffin oil or silicone oil in the formulation to avoid cracking of the hardened slab, but such additives remain in the finished foam thereby resulting in a product which may have an undesirable chemical composition and undesirable mechanical properties. Moreover, such additives may foul the mixing equipment and troublesome and time-consuming cleaning operations may be required at frequent intervals.

It is therefore an object of this invention to provide an improved apparatus for mixing the components of a polyurethane plastic together and for transferring the resulting mixture prior to solidification into a suitable mold. Another object of the invention is to provide a method for making polyurethane foam plastics having improved uniformity of pore or cell size and improved physical characteristics. Still another object of the invention is to provide an apparatus and process for making polyurethane foam plastics of substantially uniform cell size and substantially free from voids. A still further object of the invention is to provide a methode and apparatus for making large slabs of polyurethane foam plastic of substantially uniform pore or cell size having such physical characteristics that there is little or no tendency for the hardened foam product to crack. Another object of the invention is to provide a method and apparatus for making polyurethane foam plastics, without the addition of undesirable oils, that have improved chemical and mechanical properties, resist cracking and have a substantially uniform cell structure. A more specific object of the invention is to provide an apparatus and process for making cellular polyurethane plastics of improved cell size uniformity and substantially devoid of voids resulting from splashing as the foamable mixture is transferred from the mixing chamber to the zone where reaction proceeds and a solid cellular product is produced.

Other objects will become apparent from the following description with reference to the accompanying drawing in which Figure 1 is a longitudinal sectional view of a mixing apparatus combined with an embodiment of the invention;

Figure 2 is a fragmentary longitudinal sectional view taken between lines I—I and II—II of Figure 1; and Figure 3, Figure 4 and Figure 5 are fragmentary longitudinal sectional views of other embodiments of the invention taken along the lines I—I and II—II of Figure 1.

Generally speaking, the objects of the invention are accomplished by providing an apparatus having a substantially enclosed mixing zone in which the liquid components of a polyurethane foam plastic may be mixed together and means for discharging the resulting mixture from the mixing apparatus which increases the back pressure and sojourn time of the mixture in the mixing apparatus. This discharge means preferably communicates with a suitable means for shaping the polyurethane reaction mixture as chemical reaction proceeds and the mixture changes from a liquid into a solid or non-fluid porous product. More specifically, the invention provides a discharge means which is preferably a tubular conduit associated with a chamber for mixing the components of a cellular polyurethane plastic which is constricted at least at one point and then gradually increases in internal diameter from the point of constriction. The constricting means is prefarbly a bushing or insert in a conduit having a minimum internal cross-sectional dimension less than the minimum cross-sectional dimension of the conduit and having sloping walls extending from the point of minimum diameter to a point where the diameter of the insert is substantially equal to the diameter of the conduit. The constriction in the discharge conduit may be achieved by means of a valve, a bushing or insert or it may be an integral part of the conduit. The constriction may be formed by gradually decreasing the internal cross-sectional dimensions of the conduit to the desired cross-sectional dimensions and then gradually increasing the cross-sectional dimensions back to the dimensions of the conduit in order to form sloping surfaces on each side of the most constricted portion. The conduit may also be abruptly constricted but it must have the sloping surface resulting from the gradual increase of diameter extending from the restricted part on the side thereof spaced from the mixing zone.

In accordance with this invention, the mixture of components which reacts to form the polyurethane foam plastic is prepared in the usual way, such as by the process disclosed in U.S. Patent 2,764,565 or by any other suitable process. The organic compound having the reactive hydrogen atom, which is conveniently an hydroxyl polyester or an hydroxyl polyether, may be pumped or otherwise moved from a suitable storage vessel into the mixing zone where it is mixed with a polyisocyanate and a suitable catalyst or activator is introduced into the mixing zone under a pressure greater than the pressure in the mixing zone. In order to assure substantially complete mixing of the activator with the viscous polyester, the activator is injected into the mixing zone containing the polyester either continuously or intermittently. If intermittent injection is utilized, the frequency of the injection rate should be from about 50 to about 10,000 injections per minute with an injection rate of about 2,000 to about 10,000 injections per minute being preferred.

It is, of course, permissible to mix the polyisocyanate with the organic compound having the reactive hydrogen atoms before they are introduced into the mixing chamber. Indeed, reaction between the polyisocyanate and organic compound may be brought about before transfer to the mixing chamber. An excess of polyisocyanate may be used in order that the prepolymer thus formed has terminal NCO groups.

It has been found that it is possible to predetermine the cell or pore size of the finished polyurethane foam plastic by passing the reaction mixture through a conduit which restricts the flow and by controlling the time the reaction mixture of components spends in the mixing chamber and in the conduit. The period of dwell in the mixing chamber and conduit may be predetermined by means of the cross-sectional dimensions of the conduit or by means of the length of the conduit extending from the discharge nozzle. The size of the pore or cell of the polyurethane foam plastic becomes larger as the diameter of the conduit is decreased. For example, with a given composition, a product poured from a mixing zone through a conduit about 10 centimeters long and about 20 millimeters in diameter will have from about 260 to about 320 pores per square centimeter, each having a diameter of from about 0.25 to about 0.35 millimeter. The same composition poured through a conduit of the same length but having a diameter of about 10 millimeters at the restricted portion contains from about 140 to about 180 pores per square centimeter having a diameter of from about 0.45 to about 0.55 millimeter. The uniformity of cell size is further improved by providing a conduit which has a constricted portion and a portion of gradually increasing diameter adjacent the constriction and on the side spaced away from the mixing zone. In such an apparatus, the flow of reaction mixture is retarded by the constriction and a back pressure is developed. Then the conduit flares out to larger cross-sectional dimensions. Unless this increase in diameter is gradual, there is a tendency for the liquid to flow through the larger portion in a stream of the same size as flowed through the constricted portion and splashing of the liquid with the formation of undesirably large cells usually results.

It is to be noted that the conduit diameter and length of the conduit are controlled by following the rule that the smaller the cross-sectional dimension of the conduit or the longer the conduit, the smaller the number of pores per unit area and the larger the pore. The rule may also be stated thus: the longer the reaction mixture is retained in the mixing chamber and conduit, the larger the pores and the smaller the number thereof per unit area of foamed product. It is preferred to use a tubular extension or conduit having a means for varying the diameter.

Any suitable polyisocyanate, including those disclosed in U.S. Patent 2,764,565, may be utilized in preparing the foamable mixture. Specific examples include 2,4-toluylene diisocyanate, 2,6-toluylene diisocyanate, 1,4-phenylene diisocyanate, triphenylmethane-4,4',4" - triisocyanate, 1,5-naphthylene diisocyanate, diphenylmethane-4,4'-diisocyanate, and 4,4'-diphenyldimethylmethane diisocyanate and the like. Water is usually used as the cross-linking agent in order to insure proper porosity in the finished product, but any other cross-linker producing this result may be used. The chemical components react together to form a polyurethane plastic and carbon dioxide which is evolved and forms the pores in the resulting solid polyurethane plastic.

Any suitable catalyst may be utilized, including heavy metal compounds and tertiary amines, such as, for example, dimethylhexahydroaniline, diethylhexahydroaniline, reaction products of N,N-diethylaminoethanol and phenylisocyanate, ester amines, sodium phenylates and the like. In many cases it is preferred to employ what is commonly referred to as an activator mixture, i.e., a mixture comprising a catalyst, a surface active agent and a small amount of water.

The organic compound having the reactive hydrogen atom may be a polyester, either linear or branched, a polyesteramide, a polyethylene ether glycol or the like, or, in some instances, it may be a mixture of one or more of these materials. The polyesters may be prepared by reaction between any suitable polycarboxylic acids and preferably a dicarboxylic acid. Adipic, sebacic, 6-aminocaproic, phthalic, isophthalic, terephthalic, maleic, cyclohexane-1,2-dicarboxylic, and the like, including those disclosed in the aforesaid patent, may be utilized for reacting with a suitable glycol or other polyhydric alcohol to form the polyester. The various polyhydric alcohols disclosed in the aforesaid patent, including ethylene glycol, diethylene glycol and the various amino alcohols, such as, for example, ethanolamine, the aminopropanols and the like, may be used. The polyalkylene ether glycols are also obtainable in known manner, such as by polymerization of alkylene oxides, including ethylene oxide, propylene oxide and tetrahydrofuran.

Although, as stated hereinbefore, it is preferred to use a bushing or insert to constrict the discharge means, a conduit in which the constriction is an integral part thereof may be used. However, the constriction means must have a tapered surface extending therefrom at least on the side thereof spaced from the mixing apparatus.

Referring now to the drawing, Figure 1 illustrates in cross-section a mixing apparatus similar to that disclosed in the aforesaid patent to P. Hoppe et al. but provided with one embodiment of this invention. Substantially enclosed mixing chamber 1 is provided with an agitator 2 and inlets 3 and 4 through which the components of the reaction mixture may be introduced. The mixing chamber may have more inlets if more than two components are utilized in formulating the reaction mixture from which the polyurethane plastic will result. The components are constantly or intermittently injected into mixing chamber 1 where they are further mixed by means of agitator 2. The resulting reaction mixture flows below agitator 2 into the area 5 and then from the mixing nozzle through orifice 6 into conduit 7 and then into mold 12. Conduit 7 is provided with bushing 10 having tapered walls 9 and 11 and surface 8 which is substantially parallel to the inner surface of conduit 7. In this embodiment, a set of interchangeable bushings 10 of various minimum diameters is provided and one bushing or insert 10 is exchanged for another as change in the pore size and number is desired.

Figure 2 illustrates the insert 10 which provides the converging-diverging internal surfaces 9 and 11. As shown in this figure, it is preferred to provide a surface 8 although in some embodiments sloping surfaces 9 and 11 may substantially meet with very little, if any, surface 8.

Figure 3 illustrates another embodiment of a suitable insert which abruptly reduces the internal cross-sectional dimension of conduit 7 but has sloping surface 9 which is essential to avoid splashing and presence of large undesirable pores in the finished product.

Figures 4 and 5 illustrate other embodiments of a suitable constriction. The one shown in Figure 5 may be formed by counterboring. Note that no surface 8 is required in this embodiment but for best results a surface is preferred. The embodiment of Figure 5 is integral with the walls of the conduit and has a surface 8. Figure 4 illustrates an embodiment in which the constriction is formed by two arcs of a circle. The tail portion is illustrated as 9.

It is to be noted that although the constriction of Figure 1 is shown immediately adjacent the zone 5, the conduit may be constricted at any position along its length provided sufficient conduit is available for flaring the internal cross-section of the conduit to a greater dimension than that of the constriction.

For best results, the slope of the tail section should be no less than 1 in 5. That is, in the triangle ABC of Figure 2, for each unit of length of BC, the altitude AB must be at least 5 units.

In order to illustrate the effect of the diameter of conduit 7 upon the cellular structure of the hardened polyurethane foam plastic, a series of tests was made in which the chemical composition of the reaction mixture was maintained the same and all other conditions were the same except the diameter of conduit 7 was varied. The following data was obtained when making a cellular foam from a reaction mixture containing about 100 parts of a polyester prepared from about 15 mols adipic acid, about 16 mols diethylene glycol, and about 1 mol trimethylol propane. The polyester had an hydroxyl number of about 60 and an acid number below 1. The 100 parts polyester were mixed with about 49 parts toluylene diisocyanate and about 11 parts of a mixture of about 3 parts bis-diethylaminoethanol adipate, about 1 part diethylamine oleate, about 1.5 parts of a sodium salt of a sulfonated castor oil in about 54% by weight water, about 1.5 parts sulfonated ricinoleic acid in about 54% water, about 0.3 part glycerine and about 2 parts water. This mixture, when passed through conduits each about 10 cm. long and having the minimum diameter indicated in the following table, will have approximately the indicated pore structure:

*Table I*

| Conduit Diameter Reduced at Least at One Point to a Diameter in Millimeters of | Number Pores per cm.² | Pore Size, mm. |
| --- | --- | --- |
| 20 | Ca. 260–320 | Ca. 0.25–0.35 |
| 18 | Ca. 260–320 | Ca. 0.25–0.35 |
| 16 | Ca. 260–320 | Ca. 0.25–0.35 |
| 15 | Ca. 260–320 | Ca. 0.25–0.35 |
| 14 | Ca. 260–320 | Ca. 0.25–0.35 |
| 13.5 | Ca. 260–320 | Ca. 0.25–0.35 |
| 13.0 | Ca. 220–280 | Ca. 0.30–0.40 |
| 12.5 | Ca. 220–280 | Ca. 0.30–0.40 |
| 12.0 | Ca. 220–280 | Ca. 0.30–0.40 |
| 11.5 | Ca. 180–220 | Ca. 0.35–0.45 |
| 11.0 | Ca. 180–220 | Ca. 0.35–0.45 |
| 10.5 | Ca. 160–200 | Ca. 0.40–0.50 |
| 10.0 | Ca. 140–180 | Ca. 0.45–0.55 |
| 9.5 | Ca. 120–160 | Ca. 0.50–0.60 |
| 9.0 | Ca. 110–150 | Ca. 0.60–0.70 |
| 8.5 | Ca. 100–140 | Ca. 0.75–0.85 |
| 8.0 | Ca. 90–130 | Ca. 0.90–1.00 |
| 7.5 | Ca. 80–120 | Ca. 1.00–1.20 |
| 7.0 | Ca. 60–90 | Ca. 1.20–1.40 |
| 6.5 | Ca. 40–60 | Ca. 1.80–2.20 |
| 6.0 | Ca. 30–40 | Ca. 2.80–3.60 |
| 5.5 | Ca. 15–25 | Ca. 4.50–5.20 |

The density of the foam produced in the foregoing will be about 35 kg. per cubic meter.

When the foam is prepared from the following:

About 100 parts of a polyester from about 15 mols adipic acid, about 16 mols diethylene glycol, about 1 mol trimethylol propane, with the hydroxyl number 60 and an acid number below 1.
About 30 parts toluylene diisocyanate.
About 9.5 parts of a mixture of:
    About 3 parts bis-(diethylaminoethanol) adipate.
    About 1.5 parts oleate of diethylamine.
    About 1.5 parts sodium salt of a sulfonated castor oil with about 54% water.
About 1 part water.

The resulting foam will have a density of about 55 kg. per cubic meter and the pore structure indicated by the following table if discharged through a conduit having a restriction therein of the stated diameter:

*Table II*

| Diameter of Most Constricted Part of Discharge Conduit | Number Pores per cm.² | Pore Size, mm. |
| --- | --- | --- |
| 20 | Ca. 950–1050 | Ca. 0.09–0.12 |
| 18 | Ca. 800–900 | Ca. 0.10–0.13 |
| 16 | Ca. 650–750 | Ca. 0.12–0.15 |
| 15 | Ca. 650–750 | Ca. 0.12–0.15 |
| 14 | Ca. 650–750 | Ca. 0.12–0.15 |
| 13.5 | Ca. 650–750 | Ca. 0.12–0.15 |
| 13.0 | Ca. 650–750 | Ca. 0.12–0.15 |
| 12.5 | Ca. 650–750 | Ca. 0.12–0.15 |
| 12.0 | Ca. 650–750 | Ca. 0.12–0.15 |
| 11.5 | Ca. 550–650 | Ca. 0.14–0.17 |
| 11.0 | Ca. 550–650 | Ca. 0.14–0.17 |
| 10.5 | Ca. 500–550 | Ca. 0.16–0.19 |
| 10.0 | Ca. 450–480 | Ca. 0.20–0.24 |
| 9.5 | Ca. 300–350 | Ca. 0.28–0.35 |
| 9.0 | Ca. 220–260 | Ca. 0.40–0.45 |
| 8.5 | Ca. 140–180 | Ca. 0.55–0.65 |
| 8.0 | Ca. 80–120 | Ca. 0.80–1.10 |
| 7.5 | Ca. 50–70 | Ca. 1.50–1.80 |
| 7.0 | Ca. 30–40 | Ca. 2.50–3.50 |
| 6.5 | Ca. 20–25 | Ca. 4.00–5.00 |

In another example, when the following composition is used:

About 100 parts of a polyester from about 15 mols adipic acid, about 16 mols diethylene glycol, about 1 mol trimethylol propane with an hydroxyl number 60 and an acid number below 1.
About 37.4 parts toluylene diisocyanate.
About 9.0 parts of a mixture of:
    About 3 parts bis-(diethylaminoethanol)adipate.
    About 1 part oleate of diethylamine.
    About 0.75 part sodium salt of a sulfonated castor oil with about 54% water.
About 0.15 part glycerine.
About 1.5 parts water.
About 0.75 part sulfonated ricinoleic acid with about 54% water.

The resulting foam will have a density of about 45 kg. per cubic meter and the following characteristics:

*Table III*

| Inside Diameter of Constricted Part of Conduit, mm. | Number Pores per cm.² | Pore Size, mm. |
| --- | --- | --- |
| 20 | Ca. 550–650 | Ca. 0.15–0.17 |
| 18 | Ca. 500–600 | Ca. 0.16–0.18 |
| 16 | Ca. 500–600 | Ca. 0.16–0.18 |
| 15 | Ca. 500–600 | Ca. 0.16–0.18 |
| 14 | Ca. 500–600 | Ca. 0.16–0.18 |
| 13.5 | Ca. 500–600 | Ca. 0.17–0.20 |
| 13.0 | Ca. 450–550 | Ca. 0.18–0.22 |
| 12.5 | Ca. 450–550 | Ca. 0.18–0.22 |
| 12.0 | Ca. 450–550 | Ca. 0.18–0.22 |
| 11.5 | Ca. 320–400 | Ca. 0.25–0.30 |
| 11.0 | Ca. 280–340 | Ca. 0.30–0.35 |
| 10.5 | Ca. 180–240 | Ca. 0.40–0.50 |
| 10.0 | Ca. 140–180 | Ca. 0.55–0.65 |
| 9.5 | Ca. 100–130 | Ca. 0.75–0.85 |
| 9.0 | Ca. 60–100 | Ca. 1.00–1.30 |
| 8.5 | Ca. 40–60 | Ca. 1.80–2.10 |
| 8.0 | Ca. 30–40 | Ca. 2.50–3.50 |
| 7.5 | Ca. 20–30 | Ca. 4.00–5.00 |

From a comparison of the data shown in the foregoing tables, it is evident that the number of pores and the size of the pores is affected by the diameter of the constricted portion of conduit 7 and thus is affected by the period of dwell of the reaction mixture in the conduit. In addition, a much more uniform pore structure is obtained.

It has been found that a discharge means which gradually increases in internal cross-sectional dimensions from the constricted portion will produce foam of much more uniform pore size than a conduit which abruptly increases in diameter on each side of the restriction. Cellular polyurethanes produced in apparatus having a discharge nozzle similar to those shown in the drawing have as much as 90% less cells or pores outside the desired cell size than cellular polyurethanes prepared from the same reaction mixture but discharged through a conduit which is constricted but does not have sloping surface 9.

No definitely proven theory has been advanced to explain the exact function of the conduit or extension in improving the porosity of the hardened foam. It may be that confinement of the reaction mixture in an area in which the back pressure is predetermined and controlled results in the improved pore structure because of the presence of this back pressure during the early stages of the chemical reaction. Even greater uniformity is obtained if the diameter of the conduit beyond the constricted part increases gradually. In any event, it has been found that the pore structure can be predetermined and controlled by use of the conduit or elongation adjacent the discharge orifice of the mixing apparatus. Although the mixing nozzle shown in the drawing and described in detail in U.S. Patent 2,764,565 has been found to give the best results and is thus preferred, it is possible to use any other suitable mixing apparatus in combination with conduit 7 to obtain improved pore structure.

It should be apparent from the foregoing that the novel constriction in the conduit provides a means for simultaneously building-up a back pressure in the mixing chamber and for discharging the reaction mixture from the chamber at a velocity lower than that through the constricted zone, thereby avoiding the discharge of the mixture in a fine stream or jet at high velocity which would result in splashing and, consequently, voids and holes in the product.

Although the invention has been described in considerable detail in the foregoing for the purpose of illustration, it is to be understood that such detail is solely for this purpose and that variations can be made by those skilled in the art in the apparatus and process without departing from the spirit and scope of the invention except as is set forth in the claims.

What is claimed is:

1. A method for mixing liquids capable of reacting to form a solid cellular product and transferring the resulting mixture to a shaping device which comprises introducing said liquids into a chamber, agitating the resulting mixture of liquids until uniformity is obtained, flowing the mixture as a stream from the chamber through a passageway, constricting the cross-section of the stream in said passageway thereby retarding the flow thereof and creating a back-pressure in the chamber, gradually increasing the cross-section of the stream in the passageway and then flowing the stream into a shaping device.

2. The process of claim 1 wherein the said liquids are such as to react to form a solidified cellular polyurethane in said shaping device.

3. An apparatus for mixing liquids and forming molded products therefrom which comprises a chamber, means for agitating the liquids in the chamber, means for introducing liquids into the chamber, means for controlling the flow of the liquids from the chamber comprising an opening in the wall of the chamber, and a means extending from said opening externally of the chamber comprising an elongated passageway through which the liquids flow, a means in said passageway for retarding the flow of said liquid therethrough comprising a constriction, said passageway flaring outwardly adjacent the end of the constriction which is spaced from said chamber, and a shaping means for receiving said liquid adjacent the discharge end of said passageway.

4. The apparatus of claim 3 wherein the passageway also flares outwardly adjacent the end of the constriction which is adjacent said chamber.

References Cited in the file of this patent

UNITED STATES PATENTS

| 2,512,506 | Saint Denis | June 20, 1950 |
| 2,537,977 | Dulmage | Jan. 16, 1951 |
| 2,764,565 | Hoppe et al. | Sept. 25, 1956 |
| 2,816,741 | Shuffman | Dec. 17, 1957 |

FOREIGN PATENTS

| 458,729 | Canada | Aug. 9, 1949 |

OTHER REFERENCES

"Modern Plastics," Mass-produced polyurethane foams, March 1957, pp. 126–128, 264.